July 11, 1933.   A. J. DOTTERWEICH   1,918,225
WATER SOFTENING APPARATUS
Filed June 11, 1930
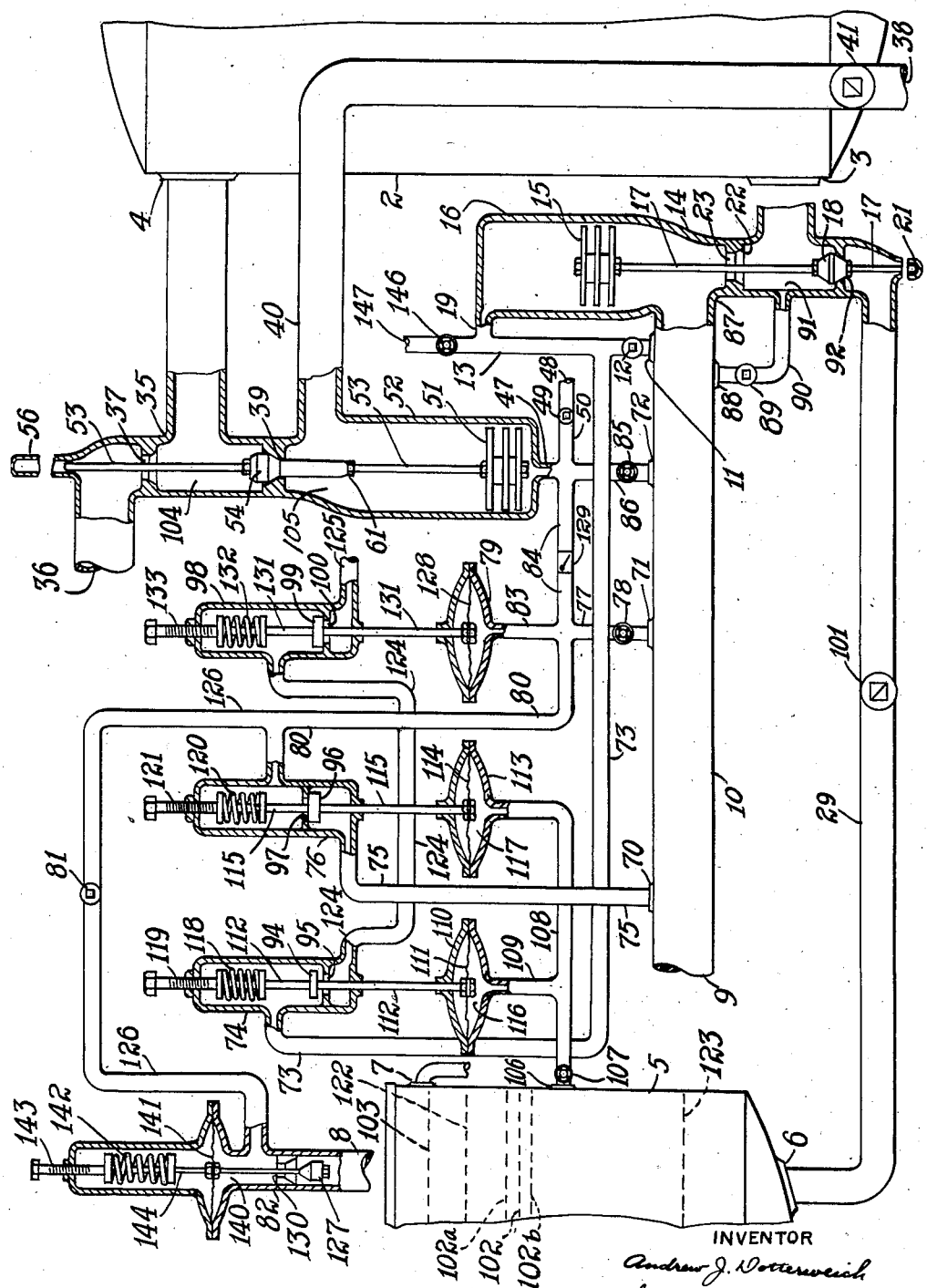
INVENTOR
Andrew J. Dotterweich
by William B. Jasper
Attorney Patented July 11, 1933

1,918,225

UNITED STATES PATENT OFFICE

ANDREW J. DOTTERWEICH, OF PITTSBURGH, PENNSYLVANIA

WATER SOFTENING APPARATUS

Application filed June 11, 1930. Serial No. 460,375.

This invention relates to water softening apparatus of the type employing a base exchange material, such as zeolite, which is adapted to be regenerated when the zeolite becomes inefficient for softening water, and it is among the objects thereof to provide apparatus which shall be adapted to automatically complete the cycle of regeneration including salting, flushing, and restoring the softener to service after the cycle of regeneration has been initiated.

Another object of the invention is to provide apparatus which is adapted to employ the fluid pressure of the system for controlling the operation of complete regeneration.

Another object of the invention is the provision of means for utilizing the fluid pressure in the brine tank for controlling the regenerating operations.

These and other objects of the invention will become more apparent from a consideration of the accompanying drawing in which like reference characters designate like parts and in which the single figure is a diagrammatic view of a water softener embodying the principles of this invention and in which the numeral 2 designates the softening tank containing zeolite material, which tank is provided with a fluid inlet connection at 3, a fluid outlet connection at 4, and is of a well known construction within.

The tank 5 contains regenerating material sufficient for several regenerations, has a brine outlet connection 6, an overflow at 7, is refilled with water through the piping 8 and has within it the familiar gravel and necessary fittings.

Leading from a suitable source of water supply at 9, piping 10 has connection at 70 by piping 75 with the casing 76 of a pilot valve, at 71 by piping 77 through valve 78 with a multiple connection of piping 80, 83 and 84, at 72 through valve 85 by piping 86 with a multiple connection of piping 84, 47 and 50, at 11 through choke 12 by a by-pass piping 13 with cylinder 16 through piping 19 and by piping 73 with the casing 74 of another pilot control valve, at 88 through choke 89 by by-pass piping 90 to within the chamber 91 and at 87 with a valve controlling the flow of water to the inlet 3 of the tank 2, which valve is designated generally by the character 14.

The valve 14 comprises a loosely fitting piston 15 in the cylinder 16 which has connection by the stem 17 with the valve member 18. In the upper end of the cylinder 16 by piping 19, connection is made with the by-pass 13 and thence by piping 73 with the casing 74 of a pilot control valve.

The stem 17 extends through the member 18 into a guide 21 in a manner which will hold it in a central position so that the valve member 18 can pass upwardly to the valve seat 22 with ease when the valve is in operation and on passing downwardly, will guide the valve member 18 to close the port 92.

The valve 14 is of the type described in a previous application filed July 1, 1927, Serial No. 202,842, and is operated by causing a flow of water around the piston 15 and is shown in its normal or inoperative position. If it is desired to operate this valve 14, a pilot valve effecting a discharge through the piping 19 is opened which permits an unbalanced pressure to be exerted against the sides of the piston 15 caused by the water flowing from the inlet piping 10, around the piston 15 and thence discharging through piping 19. Such passage of water around the piston 15 causes it to move upwardly, drawing the member 18 to its seat 22 by the stem 17 to close the port 23 and incidently open the salt inlet port at 92 thus placing the valve 14 in the operating position.

Upon closing the discharge through piping 19 from the cylinder 16, the water pressure on both sides of the piston 15 becomes equalized and accordingly with the removal of the actuating force, the piston 15, stem 17 and member 18 move by gravity to the lower or normal position, opening the port 23 and closing the port at 92.

In practicing my invention, I have found that the lowering by gravity of the members 15, 17 and 18 is quite slow due to a dash-pot effect of the piston 15 in the cylinder 16 causing a chattering or vibration of these ports until they have passed substantially to the normal position. To overcome this difficulty, a by-pass is placed leading from the piping 10 through piping 13, choke 12 and thence connecting to piping 19. Assuming the pilot valve in piping 19 to be closed, a restricted flow of water passes from piping 10 through piping 13 to the cylinder 16 in quantity sufficient to cause a downward pressure on the upper side of the piston 15 and thus hasten the closing action of valve 14. The choke 12 has an effective area to permit sufficient water to pass downwardly around the piston 15 to overcome the vibration referred to above and choke 12 will restrict the flow of water through piping 13 when valve 14 is in operation so that there will be a flow of water upwardly around the piston 15 to a discharge outlet in piping 19 sufficient to operate the valve 14.

Leading from the brine tank 5, through connection 6, piping 29 serves to direct a saturated brine solution to the tank 2 through the port 92 of valve 14. The closure of port 22 shuts off the flow of water to the tank 2 and with a discharge from the tank 2 to the drain 38 open, pressure will be almost entirely removed from the tank 2. The removal of pressure from the tank 2 permits flow by gravity and siphon action of saturated brine solution to pass from the tank 5 through connection 6, piping 29, choke 101 to the valve 14 and thence through port 92 and inlet 3 into the tank 2, thence upwardly through the softening material in the tank 2 to the outlet 4. From the tank 2, through a drain and soft water port controlling valve, generally designated by the numeral 35, the flow is through piping 40, choke 41 to an extended point of discharge to the drain at 38.

It will be noted that the point of discharge at 38 is somewhat below the levels indicated at 102 and 103 of the solution in the brine tank 5 and accordingly with the drain piping 40 filled with fluid, a siphon action exists which draws the salt solution from the tank 5 to the point of discharge at 38 in combination with a force due to gravity caused by a difference in level existing between the point of discharge and the levels 102 and 103 in the brine tank 5.

It is preferred that the solution of brine which passes to the softening material in the tank 2 shall be somewhat diluted for purpose of securing greater efficiency of operation and accordingly, a by-pass 90 connected with piping 10 at 88 and into the chamber 91 of valve 14 serves to direct a flow of water, controlled by the choke 89, to mingle with the incoming salt solution flowing through port 92 in volume sufficient to secure a desired concentration of regenerating fluid passing into tank 2.

The operation of valve 14 in closing port 23 causes a back pressure in the piping 10 as well as in piping having connection therewith. Advantage is taken of this condition to assist in controlling the operation of the apparatus and will hereinafter be referred to more in detail.

At the connection 4, a valve generally designated by the character 35, is connected with a pipe 36 leading to service, and is further connected with a drain at 38 through port 39, piping 40 and choke 41 and by the cylinder 52 through piping 47, with piping 50 leading to atmosphere at 48 through choke 49, with piping 86 through valve 85 leading to piping 10 and with piping 84 leading to a multiple connection of piping 77, 83 and 80.

Within the valve 35, a loosely fitting piston 51 operates in a cylinder 52 and has connection by a stem 53 with a compound or double acting valve member 54. The valve 54 in the lowered or normal position shown, closes port 39 leading to the drain pipe 40, permitting the flow of water from the softener tank 2 to pass through the connection 4, port 37, and thence to use at 36. In the upper operating position, valve member 54 closes the port 37 and opens the port 39 so that fluid can pass from the softener 2 through connection 4, port 39 to the drain at 38.

The stem 53 extends through the member 54 to a guide 56 for purpose of support and to assist in holding the member 54 centrally.

The fluid pressure and flow for actuating the piston 51 and member 54 from the normal position is provided through a connection 47 leading through piping 86 to piping 10 or through piping 77 and valve 78 to piping 10 whereby flow of water is upwardly around the piston 51 to the drain at 38 through the siphon 40 and the choke 41.

If it is desired to close the drain port 39 and open the port 37, the flow of fluid to the underside of the piston 51 is discontinued. On account of the restricted port opening 39, an internal pressure exists in the chamber 104 above the port 39 of the valve 35 which holds the member 54 together with the stem 53 and piston 51 in the upper position, i. e., the internal pressure holds the member 54 against the seat 37.

To insure closing of the port 39 and opening of port 37, a connection of the piping 50 directs the flow of fluid downwardly around the piston 51 from the cylinder 52 to a point of discharge at 48 through the choke 49, and further in the drain piping 40, a choke 41 serves to hold pressure in the chamber 105 below the port 39 of the valve 35 and above the piston 51 which will cause an unbalanced or greater pressure on the upper side of the piston 51 and this internal pressure causes fluid to pass downwardly around the piston 51, to discharge at 48, forcing the member 54 from its seat 37 and inserting the shank 61 of the valve 54 into the nozzle 39. Having removed the valve 54 from the seat 37 and with the shank 61 in the port 39, the pressure in the chamber 105 above piston 51 is substantially reduced and accordingly less water passes downwardly around the piston 51. However, with the port 39 partially sealed, the internal pressure in the chamber 104 above the port 39 acts on the upper side of the member 54 forcing it downwardly together with the stem 53 and piston 51 to the normal position of the valve 35, allowing the piston 51 in the cylinder 52 to act as a dashpot to insure the gradual and easy closing of the port 39 without shock or water hammer.

In the piping 84 leading to the connection 47, a check valve 129 permits the flow of water to the cylinder 52 through the connection 47 during periods when the valve 35 has the port 37 closed and the port 39 open, but checks flow in an opposite direction when the port 39 is being closed forcing a discharge from the cylinder 52 by the connection 47 to an outlet at 48, through the piping 50 and the choke 49.

It is quite obvious that during the period when fluid is passing to the cylinder 52, some fluid will pass through piping 50 to discharge at 48 and accordingly the choke 49 should have an opening which will not materially affect the pressure of fluid flowing to the cylinder 52 and permit the closing of the valve 35 as above described.

The operation of the apparatus provides for the removal of brine solution from the brine tank 5 during the period of salting and after this period, a sufficient volume of water will flow to the brine tank 5 to replace the volume of brine withdrawn. To illustrate, at the time the salting period is initiated, the level of the fluid in the brine tank is at 103 or even with the lower side of the overflow pipe 7. Withdrawal of brine will reduce the level to that shown at 102. After the salting operation is completed, a flow of water passes through piping 8 which will refill the brine tank to the upper level 103.

At 106, through valve 107, connection is made through connection 109 with the housing 110 of a pressure operated diaphragm 111 and through connection 108 with the housing 113 of another pressure operated diaphragm 114. The diaphragm 111 responds to difference in head pressure of the fluid in the chamber 116 below the diaphragm 111 and serves to actuate the valve member 94 through the connecting stem 112 to open or close the port 95.

In a similar manner, the diaphragm 114 responds to a difference in head pressure of fluid in the chamber 117 below the diaphragm 114 and serves to actuate the valve member 96 through the connection stem 115 to either open or close the port 97.

In the upper end of the casing 74, a spring 118 is attached to the stem 112 at one end and at the other end a screw 119 provides means for adjustment whereby the upward thrust due to the pressure in the chamber 116 can be partially counteracted in a manner whereby the port 94 can be closed by this spring 118 when the pressure in the chamber 116 corresponds to a predetermined head pressure of fluid in the brine tank. To illustrate, assuming brine to be withdrawn from the brine tank 5, the tension of the spring 118 is set to maintain open the port 95 when a pressure above one pound exists in the chamber 116 but when the pressure is at or below this figure, the valve member 94 will close the port 95. Likewise, when a pressure above one pound again exists in the chamber 116, the valve member 94 will again open port 95.

In a similar manner, a spring 120 in casing 76 attached at one end to the stem 115 and provided with an adjustment screw 121 on the other end, serves to counteract the upward thrust on diaphragm 114 by pressure in chamber 117 in a manner whereby after the pressure in the chamber 117 has been reduced to less than a predetermined figure, the downward thrust of the spring 120 will operate valve member 96 to open port 97. When pressure at or above a predetermined figure again exists in the chamber 117, the upward thrust against the diaphragm overcomes the downward thrust of the spring 120 and causes valve member 96 to close port 97.

The operating pressures for actuating the pilot valves 94 and 96 by the diaphragms 111 and 114 is provided by a difference in head pressure of the fluid in the brine tank 5 which exists in the operation of the apparatus.

The normal operation of this apparatus necessitates the occasional filling of the brine tank 5 with salt to maintain the level of the undissolved salt within certain limits indicated by the characters 122 and 123.

When the level of the undissolved salt is at or above the outlet 106, the static head pressure acting on the diaphragm 111 and 114 is more than in the instance when the level of the undissolved salt is somewhat below the outlet connection 106. This is due to the fluid being in part a saturated salt solution and accordingly of greater weight than in the instance when the actuating head pressure is due to water only.

For the reason that the control is by this pressure, it is quite evident that a variance in the operating periods will exist depending on the amount of undissolved salt in the brine tank. However, such variations do not materially affect the operation.

As for illustration, if the undissolved salt is above the outlet connection 106, the actuating operating pressure on the diaphragm 111 will effect the closing of the port 95 when the fluid level is at a point somewhat above the level 102 or, for illustration, at 102a, resulting in a reduced charge of saturated salt solution passing from the brine tank 5 to the tank 2.

The period for flushing out the brine solution from the tank 2 is controlled, as hereinafter referred to, by the period of time required to refill the volume withdrawn from the brine tank 5 during the salting period and accordingly with a reduced charge of salt, the period of flushing is shortened, i. e., the period of time required to refill the brine tank from the level 102a to the level 103 bears a relation to the volume of brine withdrawn.

In the instance when the level of undissolved salt is below the outlet connection 106, the actuating operating pressure on the diaphragm 111 will effect closing of the port 95 when the fluid level in the brine tank 5 is at a point somewhat below the level 102 or, for illustration, at 102b, a larger charge of saturated salt solution passing from the brine tank 5 to the tank 2. Likewise, the period of time required for flushing the brine from the tank 2 is increased in accordance with the period of time required to refill the brine tank from the level 102b to the level 103.

Referring to the illustration, the normal or inoperative position of the valve member 94 is to hold the port 95 open whereas the normal or inoperative position of the valve member 96 is to hold the port 97 closed when the level of the fluid in the brine tank 5 is at 103. The withdrawal of brine through the connection 6 causes the level 103 to drop and the spring 120 overcomes the upward thrust by pressure in 117 against the diaphragm 114 thereby opening port 97. Port 97 remains open until the level of the fluid in the brine tank is again at 103 upon completion of the cycle of regeneration, establishing flow from piping 10 through connection 70, piping 75, open port 97 to piping 80, thence in one direction through piping 126, choke 81, casing 82 of the brine tank refill valve 127 to the brine tank 5 through piping 8, and in the other direction through piping 80 to a connection 83 leading to the casing 79 holding a valve controlling diaphragm 128, through piping 84, check valve 129 to a connection 47 leading to cylinder 52 of valve 35, and a point of discharge at 48 through the connection 50 and choke 49.

In the instance of the valve member 94, this valve remains open until the level in the brine tank has passed to the level at or slightly above or below 102 and then closes the port 95. Upon the filling of the brine tank above the level 102, the valve member 94 again opens the port 95, after having performed the function of closing off the flow of water from the cylinder of the valve 14 through the piping 73 and thence from the port 95 through piping 124 to casing 98, port 100 of a pilot control valve member 99 to discharge at 125.

During the period of salting, a pressure exists in the piping 10 and piping 75, 126, 80, 83, 84, 86, 47 and 50 having connection through the valve 96 at 70 which exceeds the pressure in the piping during the period of flushing the brine from the tank 2 and is due to the member 18 closing the port 23 of the valve 14 permitting the passage of only a restricted flow through the by-pass connection 90.

Advantage is taken of this increased pressure to assist in the operation of the apparatus during the salting period and accordingly a piping connection is made to casing 79 through piping 83 by piping 80 through the port 97, piping 75 and connection 70 with the piping 10. Connection is also made with casing 79 through piping 83, valve 78, piping 77 and connection 71 to piping 10. At a time when it is desired to initiate regeneration, the opening of valve 78 admits water pressure from the piping 10 which actuates the valve 35 from the normal position by the pressure and flow of water passing through piping 84, check valve 129 and connection 47 to the piston 51, actuates the valve member 127 of the brine tank refill valve to close the port 130 as hereinafter referred to and further, through connection 83, exerts a pressure on the diaphragm 128 which is transmitted mechanically through the stem 131 to cause opening of the port 100 by the removal of the valve member 99 therefrom against the downward thrust of a spring 132 having an adjustable tension by the screw 133.

The tension of the spring 132 will be overcome by the upward pressure against the diaphragm 128 when the pressure in piping having connection at 700 is at the increased pressure during the salting period. At such times when the pressure in the piping, having connection at 70 is at normal pressure during the flushing operation, the downward thrust of the spring 132 is sufficient to overcome the upward pressure against the diaphragm 128 and accordingly closes the port 100 by the valve member 99.

Upon the opening of the port 100, water passes from the piping 10, around the piston 15 of the valve 14, closing the port 23 and opening the salt inlet port 92 by the member 18, and thence from the cylinder 16 through connection 19, piping 13, 73, through open port 95, piping 124, through open port 100 and thence to discharge at 125.

The opening of the drain port 39 of the valve 35 and the salt inlet port 92 of the valve 14 starts a flow of salt solution by gravity and siphon action from the brine tank 5 through connection 6, piping 29, through open port 92, combining with the water flow through the by-pass 90 into the chamber 91 thence through the connection 3 to the tank 2, thence upwardly through the water softening material and out at connection 4, through the open port 39, piping 40, choke 41 to discharge at 38.

The withdrawal of salt solution from the brine tank 5 causes the level of fluid therein to drop below the level 103, causing the tension of the spring 120 to move the valve member 96 from the port 97, permitting a flow of water from piping 10 through piping 75, open port 97 to piping 80 to assume a continued control of the salting and flushing operations initiated by the opening of the valve 78 after which the valve 78 is closed.

The receding of the fluid from the level 103 to the arbitrary level 102 causes the closing of the port 95 by the valve member 94 and thus removes the actuating force against the lower side of the piston 15 of the valve 14 by the simple means of stopping the flow of water around it and accordingly, the piston 15, stem 17 and valve member 18 pass to the lower or normal position causing the salt inlet port 92 to be closed and the port 23 to be opened.

The opening of the port 23 causes a drop in pressure in the piping 10, 75, 126, 80, 84, 50 and connections 47 and 83. The reduced pressure continues the operation of the valve 35 in holding the drain port 39 open but the valve port 100 is closed by the downward thrust of the spring 132 causing the valve member 99 to seal this port by overcoming the lessened upward water pressure against the diaphragm 128.

Having connection to piping 10 at 70 through piping 75, port 97, piping 126 and choke 81, a pressure actuated refill valve in the casing 82 serves to refill the brine tank 5 with water during the flushing period and is regulated by the choke 81 so that the volume of water passing through the piping 8 will refill to replace the same volume of saturated brine solution withdrawn in a period of time required to flush out the brine from the tank 2.

The flow of refill water through the port 130 is controlled by the valve member 127 in combination with a diaphragm 141, spring 142, pressure adjustment screw 143, the cross sectional area of the port 130, the pressure in the chamber 140 beneath the diaphragm 141 and a stem 144 inter-connecting the valve member 127, diaphragm 141 and lower end of spring 142.

The cross sectional area of the port 130 causes a loss in head pressure with the flow of water therethrough in accordance with the rate of flow and which pressure within the chamber 140 exerts an upward thrust on the diaphragm 141 against a downward thrust by the spring 142. The adjustment of tension on the spring 142 by the screw 143 is such that during the period of salting when flow of water through the port 130 is momentarily at a high rate, due to the increased pressure in piping 126, the upward pressure in the chamber 140 against the diaphragm 141 overcomes the downward thrust of the spring 142 and by the stem 144 causes the valve member 127 to close port 130.

At times when the pressure in the piping is below the pressure existing therein during the salting period, the spring 142 overcomes the upward thrust on diaphragm 140 by the pressure in chamber 140 and through the stem 144 the valve member 127 is removed from the port 130, permitting the flow of water through the port 130 to refill the brine tank 5.

It is to be noted that the rate of flow of water passing to the brine tank 5 and the time required for other operations of the system bear a certain relation to the pressure of water in the incoming water piping 10 in that when the pressure in piping 10 is somewhat below the customary or normal pressure, the operations of the regeneration cycle are somewhat retarded, whereas if the pressure in the piping 10 is above the customary or normal pressure, the operations of the regeneration cycle are hastened; thus the apparatus adapts itself to such variable conditions.

As recited in a previous paragraph, the valve 35 is retained open after the salting operation due to the port 97 remaining open, which permits flow of water from piping 10 through connection 70, piping 75, open port 97 to take divided paths, one path leading through piping 126, choke 81 and open port 130 to refill the brine tank, the other path leading through piping 80 check valve 129 and connection 47 to actuate the piston 51 and to a point of restricted discharge at 48 through connection 50 and the choke 49.

The period of time required for the flushing operation is determined by the operation of refilling the brine tank 5 from the arbitrary level 102 to the level 103 and is controlled by a setting of the choke 81 in a manner whereby when the brine has been washed from the tank 2, the flow of water through the connection 8 has refilled the brine tank from the lower to the upper level and is indirectly responsive to the depth of the undissolved salt in the tank 5 as heretofore explained.

The filling of the brine tank causes a gradual increasing pressure to exist in the chamber 117 within the casing 113 until the upward thrust on the diaphragm 113 overcomes the downward thrust of the spring 120 causing the valve member 96 to close the port 97 and terminate the flow of water passing through piping 126 to the brine tank refill valve as well as through piping 80, 84, connection 47 to within the cylinder 52 and to the point of discharge at 48 through piping 50.

The removal of the upward actuating force on the piston 51 permits the opening of the port 37 by the pressure in the chamber 105 and the closing of the port 39 by the pressure in the chamber 104 as heretofore explained and thus restores the apparatus to the condition where softened water passes to a point of use at 36.

The operation of this apparatus is briefly as follows: Assuming that the water softening material in the tank 2 is exhausted, initiation of the cycle of regeneration is effected by opening the valve 78 which produces a pressure on the diaphragm 128 actuating the valve member 99 to open the port 100, and producing an increased pressure on the diaphragm 141 actuating the valve member 127 to close the port 130, and further actuates the valve 54 of member 35 to open the drain port 39 and close the port 37 by flow of water around the piston 51.

The opening of the port 100 removes the pressure from the upper side of the piston 15 of valve 14 causing the valve member 18 to open the salt inlet port 92 and close the port 23 thereby initiating a flow of salt solution from the brine tank 5 to the tank 2, combining with the water through by-pass 90 in passage upwardly through the softening material and thence to the drain.

The withdrawal of salt solution causes the level 103 to be lowered and indirectly, by the lessened head pressure against the diaphragm 114, the port 97 is opened, forming a by-pass piping connection which allows a pressure and flow of water to the parts affected by the opening of the valve 78, permitting the valve 78 to be closed and thus open port 97 serves to continue the operations of salting and flushing.

The continued withdrawal of salt solution from the brine tank 5 causes a reduced pressure against the diaphragm 111 and eventually the spring 118 causes the port 95 to be closed by the valve member 94 after a charge of salt solution has passed into the tank 2.

The closing of the port 95 removes the actuating force against the lower side of the piston 15 of valve 14, causing the valve member 18 to open the port 23 and close the port 92, thus initiating the flushing operation.

The opening of the port 23 reduces the upward pressure against the diaphragm 128 causing the valve port 100 in the casing 98 to be closed by valve member 99 and spring 132, and further permits the downward thrust of spring 142 in the casing 82 to open port 130, the flow of water continuing through the open port 97 through piping 126 and 80 to refill the brine tank 5 as well as to maintain the valve 35 with the drain port 39 open.

The gradual filling of the brine tank 5 to the level 103 causes a gradual increasing pressure against the diaphragms 111 and 114, opening the port 95 and after the level is at 103, closing the port 97.

The closing of the port 97 closes off flow of water to the brine tank refill valve and to the cylinder 52 and point of discharge at 48, thus terminating the flushing operation.

The removal of the actuating force against the lower side of the piston 51 causes the pressure in the chambers 104 and 105 to close the port 39, open the port 37 and thus restore the apparatus to the position where softened water can pass to a point of use at 36.

The apparatus also lends itself to operation by manual means and valves 107, 85, and 146 serve as a means to that end.

The closing of the valve 107 serves to disconnect the self-regenerating control valves connected by piping 108; the valve 85 controls the flow of water pressure from the piping 10 through piping 86, connection 47 to cylinder 52 and is used for actuating the valve 35 from the normal to operating position and the valve 146 controls a discharge at 147 from the cylinder 16 through connection 19 and is used to cause the valve member 18 to close the port 23 and open the port 92 of valve 14.

With the valve 107 closed, the valve 85 is opened, allowing a pressure and flow from piping 10 to pass to the cylinder 52 to actuate the valve member 54 to open the port 39 and close the port 37.

The next operation is to open the valve 146, causing valve member 18 to close the port 23 and open the salt inlet port 92, starting a flow of concentrated salt solution from the brine tank 5 combining with the water through the by-pass 90 in passage through the tank 2 as hereinbefore described. The flow of brine solution is continued until sufficient salt solution has passed from the brine tank and then the valve 146 is closed.

The closing of valve 146 causes the opening of port 23 and the closing of port 92 by the valve member 18, thus initiating the flushing operation.

The flushing operation is continued until the brine solution has passed from the tank 2 and then the valve 85 is closed, terminating the flushing operation and causing the valve 35 to close port 39 and open the port 37.

During the period of flushing, the volume of brine solution withdrawn can be replaced by any suitable means such as valve controlled piping having connection (not shown) with piping 10.

By describing and illustrating herein what I consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art may, by virtue of the principles involved in this disclosure of apparatus, use methods of procedure perhaps dissimilar in appearance and arrangement but nevertheless within the scope of the invention and therefore desire to comprehend within my invention such modifications as may be necessary or desirable to adapt it to varying conditions and uses.

I claim:

1. Water softening apparatus comprising in combination a softener tank, a brine tank, interconnecting piping therefor, a source of raw water supply leading to said tanks, operating valves controlling the flow of fluid to and from said tanks to a point of use and to a drain, and mechanism responsive to the head pressure in said brine tank for controlling said operating valves to regenerate the softening material.

2. Water softening apparatus comprising in combination a softener tank, a brine tank, interconnecting piping therefor, a source of raw water supply leading to said tanks, operating valves controlling the flow of fluid to and from said tanks to a point of use and to a drain, and fluid pressure actuated means responsive to the pressure in said system and the head pressure of the brine tank for controlling said operating valves.

3. Water softening apparatus comprising in combination a softener tank, a brine tank, interconnecting piping therefor, a source of raw water supply leading to said tanks, operating valves controling the flow of fluid to and from said tanks to a point of use and to a drain, and valve mechanisms controlling said operating valves in response to the head pressure of the fluid in said brine tank.

In testimony whereof I have hereunto set my hand.

ANDREW J. DOTTERWEICH.